US012524900B2

(12) United States Patent
Yao et al.

(10) Patent No.: US 12,524,900 B2
(45) Date of Patent: Jan. 13, 2026

(54) METHOD FOR IMPROVING ESTIMATION OF LEAF AREA INDEX IN EARLY GROWTH STAGE OF WHEAT BASED ON RED-EDGE BAND OF SENTINEL-2 SATELLITE IMAGE

(71) Applicant: NANJING AGRICULTURAL UNIVERSITY, Jiangsu (CN)

(72) Inventors: Xia Yao, Nanjing (CN); Wei Li, Nanjing (CN); Tao Cheng, Nanjing (CN); Yan Zhu, Nanjing (CN); Yongchao Tian, Nanjing (CN); Weixing Cao, Nanjing (CN); Dong Li, Nanjing (CN); Hengbiao Zheng, Nanjing (CN); Yu Zhang, Nanjing (CN); Jifeng Ma, Nanjing (CN); Xue Wang, Nanjing (CN); Caili Guo, Nanjing (CN)

(73) Assignee: NANJING AGRICULTURAL UNIVERSITY, Nanjing (CN)

( * ) Notice: Subject to any disclaimer, the term of this patent is extended or adjusted under 35 U.S.C. 154(b) by 371 days.

(21) Appl. No.: 18/276,381

(22) PCT Filed: Feb. 6, 2022

(86) PCT No.: PCT/CN2022/075325
§ 371 (c)(1),
(2) Date: Aug. 8, 2023

(87) PCT Pub. No.: WO2022/166939
PCT Pub. Date: Aug. 11, 2022

(65) Prior Publication Data
US 2024/0135570 A1  Apr. 25, 2024

(30) Foreign Application Priority Data
Feb. 8, 2021 (CN) .......................... 202110172049.5

(51) Int. Cl.
*G16H 30/40* (2018.01)
*G06N 20/00* (2019.01)
(Continued)

(52) U.S. Cl.
CPC .................. G06T 7/62 (2017.01); G06T 3/40 (2013.01); *G06T 2207/10036* (2013.01); *G06T 2207/30188* (2013.01)

(58) Field of Classification Search
CPC ... G06T 7/62; G06T 3/40; G06T 2207/10036; G06T 2207/30188; A01B 79/005;
(Continued)

(56) References Cited

U.S. PATENT DOCUMENTS

2019/0012749 A1* 1/2019 Jawaharlal ......... G06Q 10/0631
2019/0244022 A1 8/2019 Hundley et al.

FOREIGN PATENT DOCUMENTS

| CN | 104899394 A | 9/2015 |
| CN | 107796764 A | 3/2018 |
| CN | 113192117 A | 7/2021 |

OTHER PUBLICATIONS

Li et al., Generating Red-Edge Images at 3 M Spatial Resolution by Fusing Sentinel-2 and Planet Satellite Products, Jun. 14, 2019, MDPI, pp. 1-18 (Year: 2019).*

(Continued)

*Primary Examiner* — Siamak Harandi
*Assistant Examiner* — Mehrazul Islam
(74) *Attorney, Agent, or Firm* — Oliff PLC (57) ABSTRACT

A method for improving estimation of leaf area index in an early growth stage of wheat based on red-edge bands of Sentinel-2 satellite images includes the following steps: acquiring field background spectrum and wheat canopy spectrum information by means of Sentinel-2; respectively acquiring a "straw-soil" spectrum and a "wheat-straw-soil"

(Continued)

spectrum, and calculating slopes of red-edge areas of the "straw-soil" spectrum and the "wheat-straw-soil" spectrum; calculating a tangent function SATF corrected by a background adjustment coefficient α; constructing a wheat LAI estimation model based on a spectral variable $SATF_{NIR-RE2}$; performing preliminary screening on the LAI estimation model using cross validation; and then testing the screened model with independent data.

8 Claims, 3 Drawing Sheets

(51) Int. Cl.
    *G06T 3/40*         (2006.01)
    *G06T 7/62*         (2017.01)
    *G16H 50/20*       (2018.01)

(58) Field of Classification Search
    CPC ....... G01N 2021/8466; G01N 21/3563; G01N 21/55; G06F 30/20
    See application file for complete search history.

(56) References Cited

OTHER PUBLICATIONS

Apr. 18, 2022 International Search Report issued in International Patent Application No. PCT/CN2022/075325.
Apr. 18, 2022 Written Opinion issued in International Patent Application No. PCT/CN2022/075325.

* cited by examiner

METHOD FOR IMPROVING ESTIMATION OF LEAF AREA INDEX IN EARLY GROWTH STAGE OF WHEAT BASED ON RED-EDGE BAND OF SENTINEL-2 SATELLITE IMAGE

TECHNICAL FIELD

The present invention belongs to the field of rapid and non-destructive monitoring of growth conditions of crops based on reflectance spectra in satellite scale, and in particular, to a method for improving estimation of leaf area index in an early growth stage of wheat based on red-edge bands of Sentinel-2 satellite images.

BACKGROUND

Leaf area index (LAI) of wheat is a key indicator to evaluate the growth condition of a wheat population, and is also an important parameter in wheat yield estimation models WOFOST and WheatGrow. Conventional methods for acquiring LAI are mainly performed by way of manual statistics or instrument measurements, and these methods only perform single-point measurement. With the development of science and technology, the satellite remote sensing technology can achieve large area agricultural production monitoring, and more and more sensors carried by satellites can perform estimation of the LAI of wheat. The most common method is to acquire spectral information in combination with image data to construct a vegetation index, and estimate the LAI of wheat through an empirical linear model. However, in the early growth stage, crops are susceptible to the soil background, leading to a decrease in the precision of LAI estimation. Moreover, as a large amount of rice straw returns to the field in a rice-wheat rotation area, a conventional soil background in a wheat production field is turned into a straw or "straw-soil" mixed background. This kind of new background severely affects the estimation of the LAI of wheat, and becomes one of the important issues need to be solved urgently in current agricultural remote sensing monitoring.

Over the past 20 years, in order to solve the problem that the soil background affects the LAI estimation precision in the early growth stage of crops, and improve the LAI estimation precision, scholars have explored various methods for eliminating noises in the soil background. Common methods include spectral derivation, new construction of vegetation index, and the like. The spectral derivation is to represent variation characteristics of a spectral curve of the crop by utilizing a first-order derivative or a second-order derivative of the spectral curve, and the growth index is usually inversed by utilizing the variation characteristics of a red-edge area during LAI estimation, so as to reduce the influence of the soil background. The variation characteristics of the red-edge area usually include red-edge slopes (the red-edge first-order derivative and the red-edge second-order derivative), red-edge turning points, and the like. The vegetation index is to enhance expression of vegetation information by combining mathematical formulas according to the specific absorption characteristics and reflection characteristics of the spectral curve of the vegetation, so as to improve the estimation precision of the growth parameters of the vegetation. The vegetation index can not only highlight the variation characteristics of the spectral curve, but also adjust the mathematical formulas according to the actual demand to enhance expression of specific information or solve specific problems. In the aspect of reducing the noise effect of the soil background, in addition to highlighting the specific red-edge characteristics between a near-infrared band and a red spectral band, the vegetation index further reduces the influence of soil brightness according to the distance or angle of a soil line between the red spectral band and the near-infrared band, so as to comprehensively improve the LAI estimation precision. The corresponding vegetation index includes the soil adjusted vegetation index (SAVI), the soil adjusted red-edge index (SARE), the modified soil adjusted vegetation index (MSAVI), the modified red-edge soil adjusted vegetation index (MRESAVI), the transformed soil adjusted vegetation index (TSAVI), and the like. The common point of the above spectral derivation and the vegetation index is to estimate the growth index of vegetation by utilizing the variation characteristics of the spectral curve of a canopy of the vegetation.

As stated in the previous studies, as a large amount of straw returns to the field, the "straw-soil" mixed background changes the variation characteristics of the spectral curve of a wheat canopy, leading to a decrease in the estimation precision of the growth index of wheat. The spectral derivation focuses on expression of the variation characteristics of the spectral curve and does not eliminate the influence of the background on the variation characteristics of the spectral curve itself. However, enhancing the specific absorption characteristics and reflection characteristics of the spectral curve of vegetation through the conventional vegetation index construction is also faced with the problem that the influence of the background on the variation characteristics of the spectral curve itself cannot be eliminated. In addition, since the addition of straw causes changes of the "soil line", adjusting the vegetation index only through soil to reduce the influence of background brightness cannot effectively improve the estimation precision of the growth vigor of wheat. Therefore, in the process of eliminating the influence of the "straw-soil" complicated background, reducing the influence of the "straw-soil" mixed background by utilizing the "wheat-straw-soil" spectral curve acquired from a single field canopy has a certain limitation that spectral curves of a plurality of objects are needed to act jointly to reduce the influence of the mixed background and improve the estimation precision of the LAI of wheat. However, there are shortcomings in current studies to eliminate the influence of the mixed background by utilizing the spectral information of the plurality of objects.

With the development of the remote sensing technology, sensors carried by a satellite remote sensing platform can not only provide visible light-near infrared bands, but also provide red-edge band and short-wave infrared band, thereby providing abundant spectral information for remote sensing monitoring of terrestrial vegetation. The Landsat 8 satellite can provide the visible light-near infrared bands and the short-wave infrared band. However, in the application process, it is limited by its low temporal-spatial resolution. The Worldview-2 satellite and the RapidEye satellite can provide the visible light-near infrared bands and the red-edge band simultaneously, but they are commercial satellites based on target acquisition, so that the acquisition of image data has a certain limitation. In recent years, the Sentinel-2 satellite launched by European Space Agency (ESA) can provide a plurality of red-edge bands and short-wave infrared bands in addition to the visible light-near infrared bands. Researchers further improve the spatial resolution to 3 m by means of image fusion of Planet and Sentinel-2, thereby providing an image data basis for the application of agricultural satellite remote sensing.

SUMMARY

An objective of the present invention is to propose a tangent function (SATF) corrected by a background adjustment coefficient, where an optimum spectral variable for estimation of LAI of wheat is searched in a plurality of spectral variables generated by SATF, a new variable including spectral characteristics of two objects ("wheat-straw-soil" and "straw-soil") is constructed, and a spectral variable capable of effectively alleviating the influence of a complicated field background in the early growth stage of wheat and improving the estimation of the LAI of wheat is finally obtained. A wheat leaf area index estimation mode is constructed based on the variable, which can be used for achieving rapid and non-destructive monitoring of LAI of wheat by Sentinel-2 within a regional range in a wheat production process.

In order to achieve the above objective, the present invention provides the following technical solution:

A method for improving estimation of leaf area index in an early growth stage of wheat based on red-edge bands of Sentinel-2 satellite images, which includes the following steps:

step (1), data acquisition: acquiring a multispectral curve of a wheat canopy and a multispectral curve of a field background based on a Sentinel-2 satellite image to serve as a "wheat-straw-soil" spectrum and a "straw-soil" spectrum respectively, and synchronously measuring a leaf area index (LAI) of wheat to acquire modeling data and inspection data;

step (2), calculation of a "straw-soil" adjusted tangent function (SATF):

a, calculating a slope of a red-edge area of the multispectral curve of the wheat canopy:

$$K_{wss}^{R2-R1} = \frac{R2_{wss} - R1_{wss}}{\Delta B_{R2-R1}}$$

where $K_{wss}^{R2-R1}$ is the slope in the multispectral curve of the wheat canopy in each growth stage, $R2_{wss}$ and $R1_{wss}$ are reflectance values of two bands in the red-edge area of the multispectral curve of the wheat canopy extracted from the Sentinel-2 satellite image in each growth stage, and $\Delta B_{R2-R1}$ is an interval between wavelength positions of the two bands;

b, calculating a slope of a red-edge area of the multispectral curve of the field background:

$$K_{ss}^{R2-R1} = \frac{R2_{ss} - R1_{ss}}{\Delta B_{R2-R1}}$$

where $K_{ss}^{R2-R1}$ is the slope in the multispectral curve of the field background, and $R2_{ss}$ and $R1_{ss}$ are reflectance values of two bands in the red-edge area of the multispectral curve of the field background extracted from the Sentinel-2 satellite image in each growth stage; and c, calculating $SATF_{R2-R1}$ through the tangent function corrected by a background adjustment coefficient α:

$$SATF_{R2-R1} = \frac{K_{wss}^{R2-R1} - \alpha \cdot K_{ss}^{R2-R1}}{1 + K_{wss}^{R2-R1} \cdot \alpha \cdot K_{ss}^{R2-R1}}$$

where α is the background adjustment coefficient;

step (3), constructing a lookup table of the background adjustment coefficient α based on simulated data of a PROSAIL model;

step (4), based on the lookup table of the background adjustment coefficient α, determining the background adjustment coefficient α according to a target growth stage to be monitored or an estimated approximate LAI scope (not a specific value of LAI), and then based on measured data, determining α according to different growth stages, and calculating corresponding $SATF_{R2-R1}$;

step (5), determination of optimum $SATF_{R2-R1}$: based on a calculation formula of the "straw-soil" adjusted tangent function (SATF) determined in step (2), calculating a plurality of $SATF_{R2-R1}$ based on multispectral band information of the red-edge area (665 nm-783 nm) of the Sentinel-2 satellite image, and determining the optimum band selection and corresponding $SATF_{R2-R1}$ according to a comparison result between $SATF_{R2-R1}$ of different growth stages and LAI relevance ($R^2$);

step (6), construction of a wheat leaf area index (LAI) estimation model: based on the modeling data, establishing a relationship between different $SATF_{R2-R1}$ in different growth stages and the LAI by means of empirical linear fitting, determining coefficients a and b of a linear relationship, and establishing the wheat LAI estimation model; and step (7), inspection of the wheat LAI estimation model: validating and testing the wheat LAI estimation model by means of ten-fold cross-validation and independent measured data respectively: according to the wheat LAI estimation model, validating an LAI predicted value estimated according to the multispectral curve of the wheat canopy and the multispectral curve of the field background; and inspecting the LAI predicted value through an LAI measured value in inspection data, and calculating a relative root mean square difference (RRMSE):

$$RRMSE_{val}(\%) = \frac{100}{\overline{LAI_m}} \sqrt{\frac{1}{N}\sum_{n=1}^{N}(LAI_{e,n} - LAI_{m,n})^2}$$

where N represents a sample number in a data set, and $LAI_{e,n}$, $LAI_{m,n}$, and $\overline{LAI_m}$ respectively represent the LAI predicted value, the LAI measured value, and a mean value of the LAI measured value.

In step (1), data is acquired from different ecosites in different years; the acquired sample data is respectively taken as a modeling data set, a validation data set, and a test data set.

The method for acquiring the multispectral curve of the wheat canopy and the multispectral curve of the field background includes the following steps: acquiring a Sentinel-2 satellite image before emergence of wheat, and Sentinel-2 satellite images corresponding to various growth stages after the emergence of wheat, where the Sentinel-2 satellite images are subjected to image preprocessing by Sen2Cor and Sen2Res released by the European Space Agency, and radiometric calibration and atmospheric correction on the Sentinel-2 satellite images are performed by adopting the Sen2Cor; performing downscaling processing on a coarse resolution band of the Sentinel-2 satellite images by adopting the Sen2Res, and improving the spatial resolution of each band of the Sentinel-2 satellite images to 10 m; and extracting the multispectral curves in the preprocessed Sentinel-2 satellite images according to GPS information of a wheat sampling point acquired by field investigation as the multispectral curve of the wheat canopy and the multispectral curve of the field background.

The red-edge area (665 nm-783 nm) of the multispectral curve of the wheat canopy and the multispectral curve of the field background extracted from the Sentinel-2 satellite image includes five pieces of band information: R, RE1, RE2, RE3, and NIR.

Besides the step of acquiring the GPS information of the wheat sampling point by field investigation, the method for acquiring wheat by a statistical method and measuring the LAI of wheat includes the following steps: counting the number of stems and tillers of wheat in a square block with the side length of 1 m*1 m; acquiring 30 stems and tillers of wheat and separating them according to organs; scanning the wheat leaf area by utilizing a leaf area meter; and calculating the sum of all wheat leaf areas within 1 m*1 m as the LAI of wheat.

The leaf area meter may be an LI-3000c leaf area meter produced by US LI-COR company.

In the present invention, other methods capable of acquiring the true area of the leaf may be adopted to acquire the leaf area of wheat.

In step (3), the method for constructing the lookup table of the background adjustment coefficient α based on the simulated data of the PROSAIL model includes the following steps: summarizing an approximate LAI scope applicable to each value of the background adjustment coefficient α according to $SATF_{R2-R1}$-LAI performance in different backgrounds obtained by different values of the background adjustment coefficient α; and determining the corresponding growth stage of wheat empirically according to the approximate scope.

More specifically, the method includes the following steps: between 0 and 1, empirically valuing the background adjustment coefficient α with a step length of 0.1; calculating $SATF_{R2-R1}$ corresponding to all α values based on the simulated data in different backgrounds obtained by the PROSAIL model; summarizing the approximate LAI scope applicable to each background adjustment coefficient α value according to scatter diagram distribution of "$SATF_{R2-R1}$-LAI" and the principle of same "$SATF_{R2-R1}$-LAI" in different backgrounds; and obtaining the growth stage applicable to each background adjustment coefficient α value according to the LAI scope to form the lookup table for determining the background adjustment coefficient α by the growth stage or the approximate LAI scope.

In step (4), according to the lookup table of the background adjustment coefficient α, for $SATF_{R2-R1}$, the background adjustment coefficient α is set to be 1 in a tillering stage, and the background adjustment coefficient α is set to be 0.2 in a jointing & booting stage; and for $SATF_{R2-R1}$ in other band combinations, the background adjustment coefficient α is set to be 1 in the tillering stage, and the background adjustment coefficient α is set to be 0.5 in the jointing & booting stage.

In step (5), the method for determining the optimum band selection is performed in two steps:

a, based on the five pieces of band information: R, RE1, RE2, RE3, and NIR in the red-edge area of the multispectral curve of the wheat canopy extracted from the Sentinel-2 satellite image, determining calculation formulas of different slopes by way of permutation and combination, totally 10 slopes; and b, based on the calculation formulas of the 10 different slopes, respectively calculating the slope of the red-edge area of the multispectral curve of the wheat canopy and the slope of the red-edge area of the multispectral curve of the field background; acquiring 10 different $SATF_{R2-R1}$ through step (2); and performing linear fitting on the obtained $SATF_{R2-R1}$ with the LAI measured value of the corresponding growth stage, where $SATF_{R2-R1}$ with the maximum degree of linear fitting $R^2$ serves as the optimum option for estimating the LAI of wheat in the growth stage, and corresponding two bands are the optimum band combination: NIR-RE2.

In step (6), the optimum wheat leaf area index (LAI) estimation models in different growth stages are as follows:
tillering stage: LAI=1664.8×($SATF_{NIR-RE2}$)+1.8462; and
jointing & booting stage: LAI=1966.7×($SATF_{NIR-RE2}$)+2.746.

In step (7), a test result is RRMSE=49.81%.

The inventor estimates the performance of wheat LAI modeling and inspection by means of the SATF, and $SATF_{NIR-RE2}$ and its LAI estimation model can effectively alleviate the influence caused by the field "straw-soil" complicated background after the straw returns to field in the wheat production process in the early growth stage of wheat, and have a higher degree of fitting $R^2$ in the modeling process and a lower RRMSE in the validating process. The spectral variable can effectively alleviate the influence of the "straw-soil" mixed background.

A method for improving estimation precision of a leaf area index in an early growth stage of wheat, which includes the following steps:

step (1), acquiring valid Sentinel-2 satellite image data in each growth stage before and after emergence of wheat; preprocessing a Sentinel-2 satellite image by adopting Sen2Cor and Sen2Res, and improving the spatial resolution of each band of the Sentinel-2 satellite image to 10 m; and extracting multispectral curves in the preprocessed Sentinel-2 satellite image according to GPS information of a wheat sampling point acquired by field investigation as the multispectral curve of the wheat canopy and the multispectral curve of the field background;

step (2), calculating $SATF_{NIR-RE2}$ by the following formula:

calculating a slope between two bands of the multispectral curve of the wheat canopy:

$$K_{wss}^{NIR-RE2} = \frac{NIR_{wss} - RE2_{wss}}{\Delta B_{NIR-RE2}}$$

calculating a slope between two bands of the multispectral curve of the field background:

$$K_{ss}^{NIR-RE2} = \frac{NIR_{ss} - RE2_{ss}}{\Delta B_{NIR-RE2}}$$

obtaining $SATF_{R2-R1}$ of different growth stages according to a background adjustment coefficient α determined in different growth stages:

tillering stage:

$$SATF_{NIR-RE2} = \frac{K_{wss}^{NIR-RE2} - 1 \cdot K_{ss}^{NIR-RE2}}{1 + K_{wss}^{NIR-RE2} \cdot 1 \cdot K_{ss}^{NIR-RE2}}$$

jointing & booting stage:

$$SATF_{NIR-RE2} = \frac{K_{wss}^{NIR-RE2} - 0.5 \cdot K_{ss}^{NIR-RE2}}{1 + K_{wss}^{NIR-RE2} \cdot 0.5 \cdot K_{ss}^{NIR-RE2}}$$

step (3), estimating the LAI of wheat by utilizing the wheat LAI estimation models in the different growth stages based on the $SATF_{R2-R1}$ of different growth stages obtained in step (2):

tillering stage: LAI=1664.8×($SATF_{NIR-RE2}$)+1.8462; and jointing & booting stage: LAI=1966.7×($SATF_{NIR-RE2}$)+ 2.746.

Compared with the prior art, the present invention has the following beneficial effects:

By constructing a plurality of SATFs and its LAI estimation models, $SATF_{NIR-RE2}$ shows the best performance, which can effectively alleviate the influence caused by the field "straw-soil" complicated background after the straw returns to field on LAI estimation in the wheat production process, particularly in the early growth stage of wheat.

The method provided by the present invention gets rid of dependence of the conventional soil vegetation index on the soil line and limitation to eliminate the influence of the single soil background, can effectively alleviate the influence caused by the complicated background of the wheat field after the straw returns to field, and can be applied to real-time, non-destructive and accurate estimation of the leaf area index of wheat in the early growth stage within the regional range based on a satellite platform.

DETAILED DESCRIPTION

The technical solution of the present invention will be further described below in conjunction with specific embodiments.

Embodiment 1

The present embodiment is performed based on field investigation data in different years and corresponding Sentinel-2 image data, and is specifically shown in Table 1:

TABLE 1

Ground investigation in different growth stages and acquisition condition of Sentinel-2 satellite images

| Time Location | Stage | Ground sampling date | Acquisition condition of Sentinel-2 satellite images | Use |
|---|---|---|---|---|
| 2017-2018 Xinghua City | Before emergence | / | S2B_MSIL1C_20171110T023909_ N0206_R089_T50SQB_ 20171110T061055.SAFE | Modeling and cross validation |
| | Tillering stage | Mar. 8-Mar. 10, 2018 | S2B_MSIL1C_20180310T023539_ N0206_R089_T51STS_ 20180310T061227.SAFE | Modeling and cross validation |
| | Jointing stage | Mar. 22-Mar. 24, 2018 | S2A_MSIL1C_20180325T023651_ N0206_R089_T50SQB_ 20180325T042711.SAFE | Modeling and cross validation |
| | Booting stage | Apr. 9-Apr. 11, 2018 | S2B_MSIL1C_20180409T023549_ N0206_R089_T50SQB_ 20180409T061223.SAFE | Modeling and cross validation |
| 2018-2019 Xinghua City | Before emergence | / | S2A_MSIL1C_20181120T024001_ N0207_R089_T50SQB_ 20181120T041432.SAFE | Application test |
| | Tillering stage | Mar. 8-Mar. 10, 2019 | S2B_MSIL1C_20190315T023549_ N0207_R089_T50SQB_ 20190315T042531.SAFE | Application test |
| | Jointing stage | Mar. 22-Mar. 24, 2019 | S2A_MSIL1C_20190330T023551_ N0207_R089_T50SQB_ 20190330T042538.SAFE | Application test |

Measured data of field investigation in Xinghua in 2017-2018 is taken as a modeling data set, and cross validation is performed, where the data set is required to have good systematicness, large sample number, and the like, including low LAI level and high LAI level, so the obtained model can fit different LAI levels.

Measured data of field investigation in Xinghua in 2018-2019 is taken as a validation data set. Compared with the modeling data, the validation data set is less required, has a small sample number and as a result of difference on environments in different years, may have a risk that inspection of the LAI estimation model in eliminating background noises is affected due to different physiological and biochemical parameter states of the wheat itself.

Figure 2:
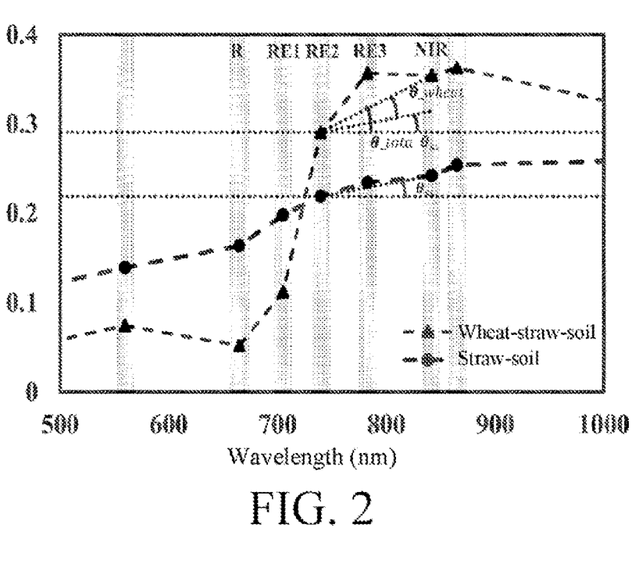
FIG. 2 shows a "wheat-straw-soil" multispectral curve and a "straw-soil" multispectral curve.

A method for improving estimation of leaf area index in an early growth stage of wheat based on red-edge bands of Sentinel-2 satellite images, which includes the following specific steps:

Step (1), data acquisition a, acquisition of GPS information: GPS information is acquired by utilizing a handheld GPS meter in a process of field investigation of a wheat sample point;

b, acquisition of LAI data: the number of stems and tillers of wheat in a square block with the side length of 1 m*1 m is counted; then 30 stems and tillers of wheat are acquired and are separated according to organs; the wheat leaf area is scanned by utilizing an LI-3000c leaf area meter (US LI-COR company); and the sum of all wheat leaf areas within 1 m*1 m is calculated as the LAI of wheat;

c, acquisition of Sentinel-2 satellite image: Sentinel-2 image data in a corresponding region and at corresponding times is acquired from the official website of the European Space Agency (https://scihub.copernicus.eu/dhus/#/home), including the Sentinel-2 satellite image before emergence of wheat, which is used for acquiring the multispectral curve of the field background; and the Sentinel-2 satellite images corresponding to various growth stage after the emergence of wheat, which are used for acquiring the multispectral curve of the field wheat canopy;

d, preprocessing of Sentinel-2 satellite image: radiometric calibration and atmospheric correction are performed on the Sentinel-2 satellite image firstly by adopting Sen2Cor, then downscaling processing is performed on a coarse resolution band of the Sentinel-2 satellite image by adopting Sen2Res, and the spatial resolution of each band of the Sentinel-2 satellite image is improved to 10 m; and e, acquisition of multispectral information of Sentinel-2: multispectral information of corresponding pixels in the preprocessed Sentinel-2 satellite image is extracted by utilizing the measured GPS information of the ground sampling point in field investigation, so as to acquire the multispectral curve (i.e., the "wheat-straw-soil" multispectral curve) of the wheat canopy and the multispectral curve (i.e., the "straw-soil" multispectral curve) of the field background shown in FIG. 2; the red-edge area of the multispectral curve of the wheat canopy and the multispectral curve of the field background extracted from the Sentinel-2 satellite image includes five pieces of band information: R, RE1, RE2, RE3, and NIR; and the multispectral curve of the wheat canopy and the multispectral curve of the field background, together with the ground measured LAI, form the modeling data and the inspection data for constructing and validating the LAI estimation model.

Step (2), construction of a new index SATF (straw-soil adjusted tangent function) based on the band of the red-edge area of the field background spectrum before emergence of wheat and the band of the red-edge area of the wheat field canopy spectrum in each growth stage after the emergence of wheat:

a, a slope of the red-edge area of the multispectral curve of the wheat canopy is calculated:

$$K_{wss}^{R2-R1} = \frac{R2_{wss} - R1_{wss}}{\Delta B_{R2-R1}}$$

where $K_{wss}^{R2-R1}$ is the slope in the multispectral curve of the wheat canopy in each growth stage, $R2_{wss}$ and $R1_{wss}$ are reflectance values of two bands in the red-edge area of the multispectral curve of the wheat canopy extracted from the Sentinel-2 satellite image in each growth stage, and $\Delta B_{R2-R1}$ is an interval between wavelength positions of the two bands;

b, a slope of the red-edge area of the multispectral curve of the wheat field background is calculated:

$$K_{ss}^{R2-R1} = \frac{R2_{ss} - R1_{ss}}{\Delta B_{R2-R1}}$$

where $K_{wss}^{R2-R1}$ is the slope in the multispectral curve of the field background, and $R2_{wss}$ and $R1_{wss}$ are reflectance values of two bands in the red-edge area of the multispectral curve of the field background extracted from the Sentinel-2 satellite image in each growth stage; and c, $SATF_{R2-R1}$ of different growth stages is calculated as follows:

$$SATF_{R2-R1} = \frac{K_{wss}^{R2-R1} - \alpha \cdot K_{ss}^{R2-R1}}{1 + K_{wss}^{R2-R1} \cdot \alpha \cdot K_{ss}^{R2-R1}}$$

Figure 1:
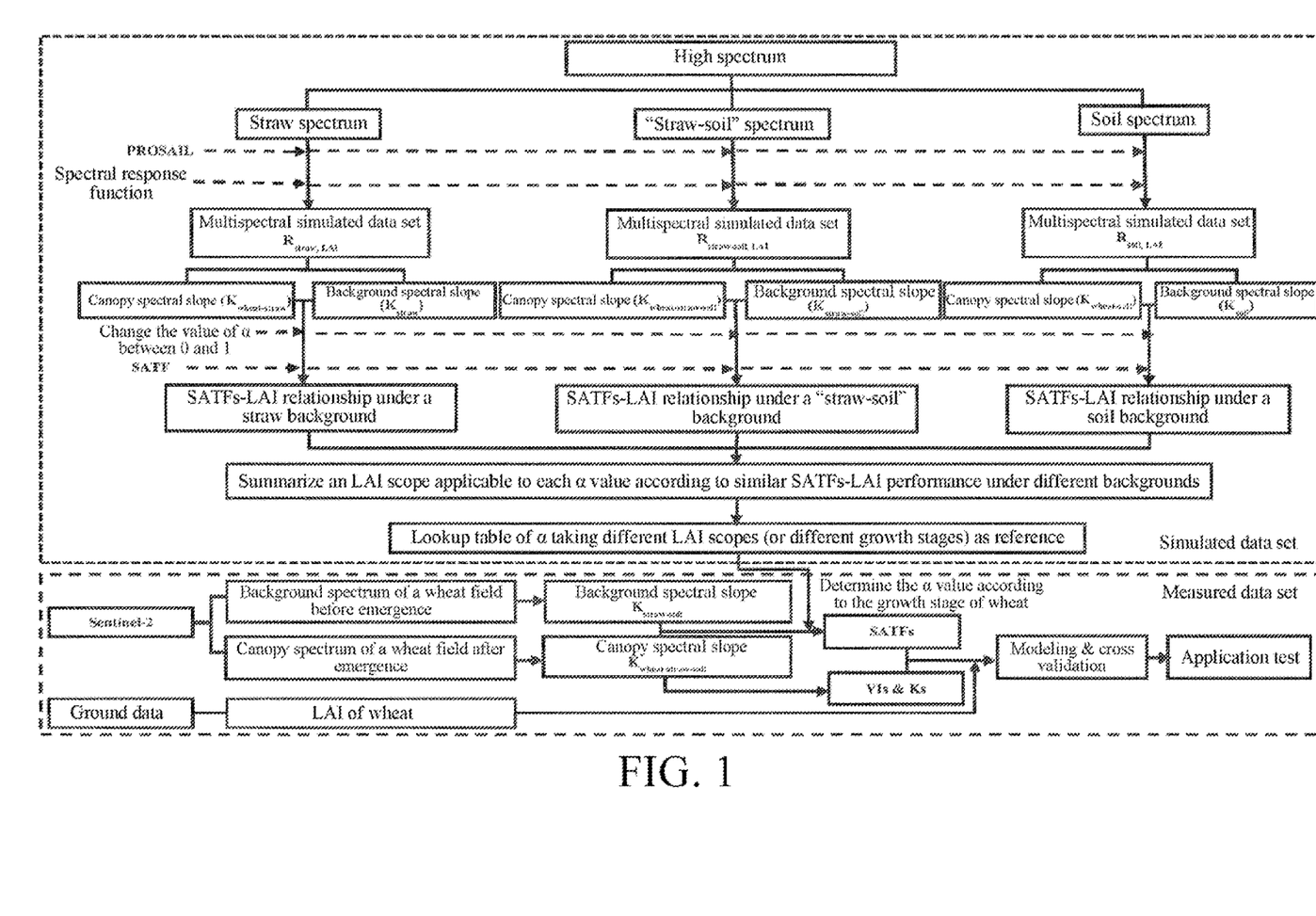
FIG. 1 shows generation of a lookup table of a background adjustment coefficient α and actual application of corresponding SATFs.
Figure 3:
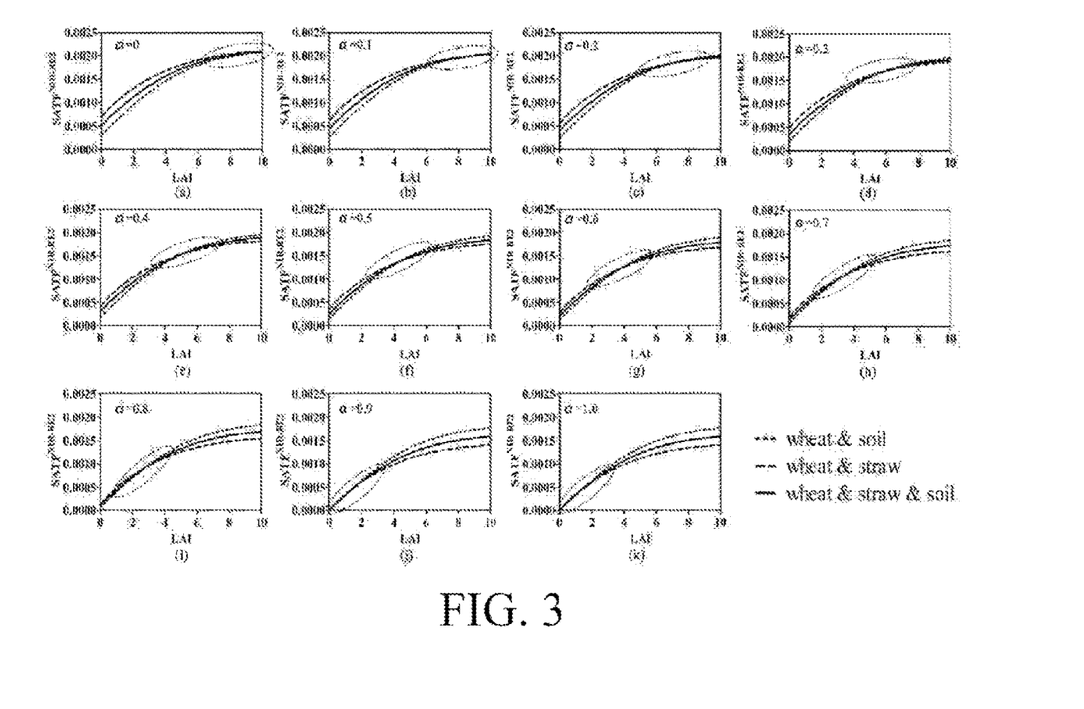
FIG. 3 shows performance of $SATF_{NIR-RE2}$ obtained by simulated data in different backgrounds.

Step (3), as shown in FIG. 1, a lookup table of a background adjustment coefficient $\alpha$ is constructed based on simulated data of a PROSAIL model: between 0 and 1, $\alpha$ is empirically valued with a step length of 0.1; $SATF_{R2-R1}$ corresponding to all $\alpha$ values is calculated based on the simulated data in different backgrounds obtained by the PROSAIL model; an approximate LAI scope applicable to each $\alpha$ value is summarized according to scatter diagram distribution (FIG. 3) of "$SATF_{R2-R1}$-LAI" and the principle of same "$SATF_{R2-R1}$-LAI" in different backgrounds; and the growth stage applicable to each $\alpha$ value is obtained according to the LAI scope to form the lookup table for determining the $\alpha$ value by the growth stage or the approximate LAI scope (as shown in Table 2).

TABLE 2

Lookup table for approximate LAI scope and background adjustment coefficient $\alpha$ in corresponding growth stage

| Related growth stage of wheat | Optimum LAI scope | $\alpha$ value |
|---|---|---|
| Tillering stage | 0-3← | 1.0 |
| Jointing & booting stage | 3-7← | 0.5 |
| Heading stage | 7-10→ | 0 |

Note: ←: the optimum LAI scope approaches to the minimum value of LAI; and →: the optimum LAI scope approaches to the maximum value of LAI.

Step (4), according to a target growth stage, with reference to the lookup table of the background adjustment coefficient $\alpha$, it is confirmed that for $SATF_{R2-R1}$, the background adjustment coefficient $\alpha=1$ is set in the tillering stage, and the background adjustment coefficient $\alpha=0.2$ is set in the jointing & booting stage; for $SATF_{R2-R1}$ in other band combinations, the background adjustment coefficient $\alpha=1$ is set in the tillering stage, and the background adjustment coefficient $\alpha=0.5$ is set in the jointing & booting stage; and then based on the measured data in Xinghua in 2017-2018, $SATF_{R2-R1}$ is calculated according to different growth stages.

Step (5), determination of optimum $SATF_{R2-R1}$: based on a calculation formula of the "straw-soil" adjusted tangent function ($SATF_{R2-R1}$SATF) determined in step (2), a plurality of $SATF_{R2-R1}$ are calculated based on multispectral band information of the red-edge area (665 nm-783 nm) of the Sentinel-2 satellite image, and the modeling precision and the cross validation precision of different $SATF_{R2\text{-}R1}$ for estimating the LAI of wheat in different growth stages are compared, as shown in Table 3.

In the modeling process, as RE1-R and NIR-RE3 are respectively located in areas at the front end and the tail end of the red-edge area, $SATF_{RE1\text{-}R}$ and $SATF_{NIR\text{-}RE3}$ have limited sensitivity on LAI, so they have limited modeling precision during LAI estimation. Other $SATF_{R2\text{-}R1}$ all have good performance, where $SATF_{NIR\text{-}RE2}$ has the best performance, with better performance in the tillering stage and the jointing & booting stage, and has robustness, i.e., the best construction form is as follows:

a, a slope between two bands of the multispectral curve of the wheat canopy is calculated:

$$K_{wss}^{NIR-RE2} = \frac{NIR_{wss} - RE2_{wss}}{\Delta B_{NIR-RE2}}$$

b, a slope between two bands of the multispectral curve of the field background is calculated:

$$K_{ss}^{NIR-RE2} = \frac{NIR_{ss} - RE2_{ss}}{\Delta B_{NIR-RE2}}$$

c, $SATF_{NIR\text{-}RE2}$ is calculated according to values of the background adjustment coefficient α determined in different growth stages:

tillering stage:

$$SATF_{NIR-RE2} = \frac{K_{wss}^{NIR-RE2} - 1 \cdot K_{ss}^{NIR-RE2}}{1 + K_{wss}^{NIR-RE2} \cdot 1 \cdot K_{ss}^{NIR-RE2}}$$

jointing & booting stage:

$$SATF_{NIR-RE2} = \frac{K_{wss}^{NIR-RE2} - 0.5 \cdot K_{ss}^{NIR-RE2}}{1 + K_{wss}^{NIR-RE2} \cdot 0.5 \cdot K_{ss}^{NIR-RE2}}$$

TABLE 3

Modeling precision and cross validation precision for estimating LAI of wheat based on different spectral variables of measured data

| | Stage | Tillering stage | | Jointing & booting stage | | All stages | |
|---|---|---|---|---|---|---|---|
| | Variable | $R_{cal}^2$ | $RRMSE_{val}$ | $R_{cal}^2$ | $RRMSE_{val}$ | $R_{cal}^2$ | $RRMSE_{val}$ |
| $K_S$ | $K^{RE1-R}$ | 0.05 | 32.30% | 0.24 | 21.63% | 0.18 | 38.67% |
| | $K^{RE2-R}$ | 0.13 | 33.53% | 0.54 | 16.60% | 0.57 | 27.95% |
| | $K^{RE3-R}$ | 0.19 | 34.89% | 0.59 | 15.74% | 0.65 | 25.12% |
| | $K^{NIR-R}$ | 0.20 | 33.38% | 0.60 | 15.65% | 0.66 | 24.51% |
| | $K^{RE2-RE1}$ | 0.21 | 32.36% | 0.56 | 16.16% | 0.61 | 26.75% |
| | $K^{RE3-RE1}$ | 0.25 | 32.24% | 0.60 | 15.39% | 0.67 | 24.59% |
| | $K^{NIR-RE3}$ | 0.26 | 31.69% | 0.61 | 15.44% | 0.68 | 23.84% |
| | $K^{RE3-RE2}$ | 0.33 | 29.81% | 0.60 | 15.73% | 0.70 | 22.91% |
| | $K^{NIR-RE2}$ | 0.31 | 29.03% | 0.61 | 15.73% | 0.70 | 22.79% |
| | $K^{NIR-RE3}$ | 0.02 | 33.34% | 0.33 | 20.08% | 0.40 | 32.70% |
| $SATF_S$ | $SATF_{RE1-R}$ | 0.25 | 31.90% | 0.25 | 21.20% | 0.46 | 31.49% |
| | $SATF_{RE2-R}$ | 0.41 | 29.13% | 0.55 | 16.41% | 0.59 | 27.39% |
| | $SATF_{RE3-R}$ | 0.44 | 27.88% | 0.59 | 15.88% | 0.72 | 22.79% |
| | $SATF_{NIR-R}$ | 0.47 | 28.74% | 0.61 | 15.50% | 0.74 | 21.83% |
| | $SATF_{RE2-RE1}$ | 0.40 | 29.30% | 0.55 | 16.31% | 0.66 | 25.02% |
| | $SATF_{RE3-RE1}$ | 0.44 | 27.70% | 0.59 | 15.53% | 0.72 | 22.91% |
| | $SATF_{NIR-RE3}$ | 0.47 | 26.76% | 0.61 | 15.25% | 0.74 | 21.35% |
| | $SATF_{RE3-RE2}$ | 0.47 | 25.81% | 0.59 | 15.79% | 0.75 | 21.15% |
| | $SATF_{NIR-RE2}$ | 0.52 | 24.22% | 0.62 | 15.21% | 0.78 | 19.60% |
| | $SATF_{NIR-RE3}$ | 0.24 | 29.56% | 0.38 | 19.24% | 0.59 | 27.17% |
| $VI_S$ | NDVI | 0.18 | 33.40% | 0.47 | 17.78% | 0.50 | 29.36% |
| | NDRE1 | 0.31 | 31.19% | 0.54 | 16.63% | 0.59 | 26.71% |
| | NDRE2 | 0.35 | 27.68% | 0.53 | 16.66% | 0.68 | 23.77% |
| | NDRE3 | 0.02 | 33.18% | 0.20 | 21.87% | 0.27 | 36.30% |
| | EVI | 0.21 | 33.14% | 0.54 | 16.68% | 0.62 | 26.29% |
| | MEVI1 | 0.32 | 32.02% | 0.57 | 15.81% | 0.66 | 24.71% |
| | MEVI2 | 0.38 | 26.96% | 0.55 | 16.40% | 0.70 | 22.81% |
| | MEVI3 | 0.02 | 33.60% | 0.20 | 22.13% | 0.26 | 36.20% |
| | SAVI | 0.20 | 34.16% | 0.54 | 16.35% | 0.62 | 26.78% |
| | SARE1 | 0.29 | 32.38% | 0.58 | 15.84% | 0.65 | 25.12% |
| | SARE2 | 0.34 | 28.33% | 0.56 | 16.15% | 0.71 | 23.06% |
| | SARE3 | 0.02 | 33.60% | 0.24 | 21.15% | 0.32 | 35.08% |
| | CIg | 0.14 | 32.73% | 0.55 | 16.34% | 0.61 | 26.09% |
| | $CI_{RE1}$ | 0.27 | 30.21% | 0.55 | 16.28% | 0.62 | 25.87% |
| | $CI_{RE2}$ | 0.34 | 28.45% | 0.54 | 16.73% | 0.69 | 23.45% |
| | $CI_{RE3}$ | 0.02 | 32.94% | 0.20 | 22.04% | 0.27 | 36.37% |

Step (6), based on the modeling data, the determined $SATF_{NIR-RE2}$ with the best performance and the LAI corresponding thereto are empirically and linearly fit, a regression coefficient a and an intercept b of an empirical linear relationship in different growth stages are determined, and the wheat LAI estimation model is established:

tillering stage:

LAI=1664.8×(SATF$_{NIR-RE2}$)+1.8462;

jointing & booting stage:

LAI=1966.7×(SATF$_{NIR-RE2}$)+2.746;

Step (7), inspection of the wheat LAI estimation model: the wheat LAI estimation model is validated and tested by means of ten-fold cross-validation and independent measured data respectively: according to the wheat LAI estimation model, an LAI predicted value estimated according to the multispectral curve of the wheat canopy and the multispectral curve of the field background is validated; the wheat LAI estimation model is tested by adopting the independent measured data: the LAI predicted value is inspected through an LAI measured value in inspection data, and a relative root mean square difference (RRMSE) is calculated:

$$RRMSE_{val}(\%) = \frac{100}{\overline{LAI_m}}\sqrt{\frac{1}{N}\sum_{n=1}^{N}(LAI_{e,n} - LAI_{m,n})^2}$$

where N represents a sample number in a data set, and $LAI_{e,n}$, $LAI_{m,n}$, and $\overline{LAI_m}$ respectively represent the LAI predicted value, the LAI measured value, and a mean value of the LAI measured value.

Figure 4:
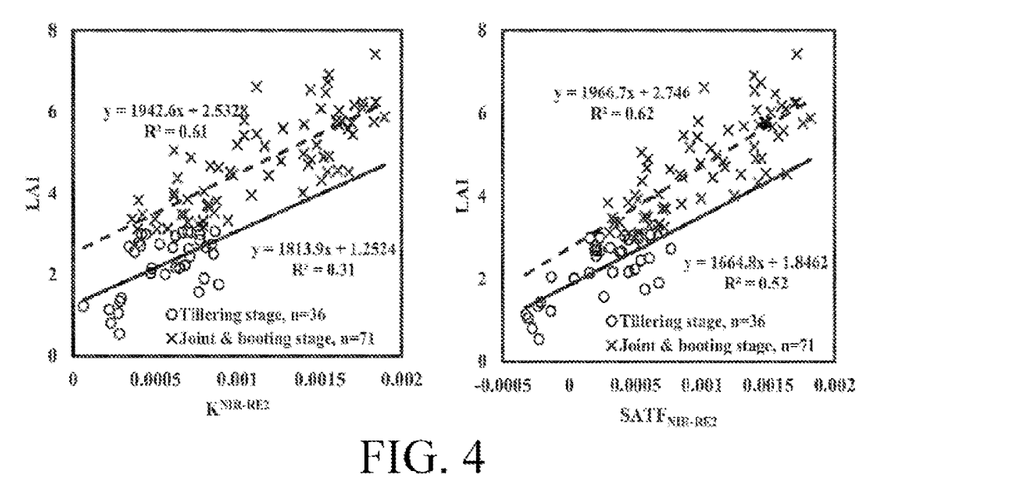
FIG. 4 shows a modeling result where LAI of wheat is estimated by slopes $K^{NIR-RE2}$ (left diagram) and $SATF_{NIR-RE2}$ (right diagram) in different growth stages.
Figure 5:
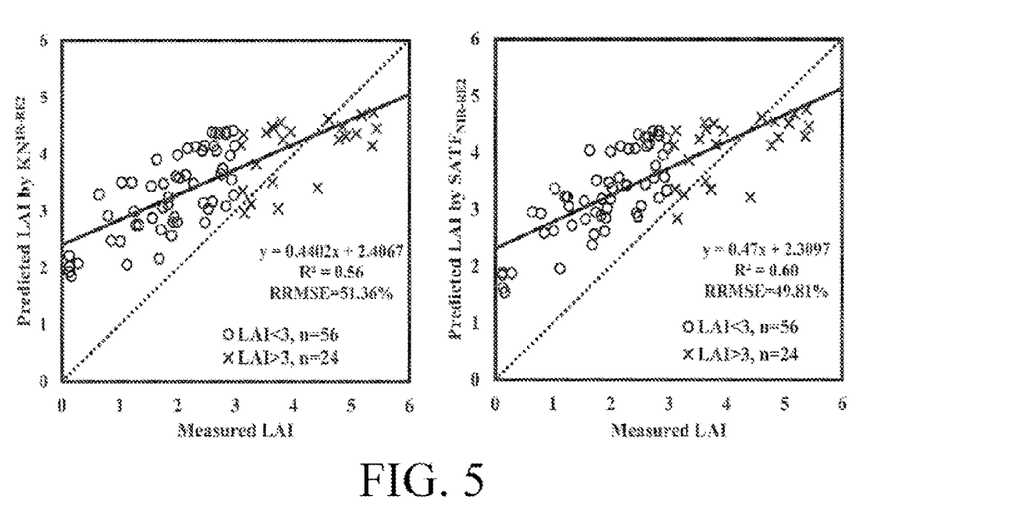
FIG. 5 shows a modeling result where LAI of wheat is estimated by slopes $K^{NIR-RE2}$ (left diagram) and $SATF_{NIR-RE2}$ (right diagram) in different growth stages.

Inspection results are shown in FIG. 4 and FIG. 5. Cross validation results of the models show that the $SATF_{NIR-RE2}$ has the best and the most stable performance, with the modeling precision of $R^2=0.52$ and $R^2=0.62$ respectively in the tillering stage and the jointing & booting stage and the cross validation precision of RRMSE=24.22% and RRMSE=15.21% respectively. Meanwhile, by integrating data in three growth stages, the $SATF_{NIR-RE2}$ has the modeling precision of $R^2=0.78$ and the cross validation precision of RRMSE=19.60%. In the independent test data set, the $SATF_{NIR-RE2}$ has the validation precision of RRMSE=49.81%, which is superior to the conventional slope $K^{NIR-RE2}$ (RRMSE=51.36%).

The SATF constructed in the present embodiment can eliminate the influence of the complicated background of the wheat field after the straw returns to field, and improve estimation of the LAI of wheat, and particularly improves the LAI estimation in the early growth stage of wheat. The obtained LAI estimation model has robustness.

The preferred embodiments of the present invention are described in detail above. However, the present invention is not limited to the above embodiments. Those of ordinary skill in the art may further make various variations without departing from the purpose of the present invention within the scope of knowledge.

What is claimed is:

1. A method for improving estimation of leaf area index in an early growth stage of wheat based on red-edge bands of Sentinel-2 satellite images, comprising the following steps:

step (1), data acquisition: acquiring a multispectral curve of a wheat canopy and a multispectral curve of a field background based on a Sentinel-2 satellite image, and synchronously measuring a leaf area index (LAI) of wheat to acquire modeling data and inspection data;

step (2), calculation of a "straw-soil" adjusted tangent function (SATF):

a, calculating a slope of a red-edge area of the multispectral curve of the wheat canopy:

$$K_{wss}^{R2-R1} = \frac{R2_{wss} - R1_{wss}}{\Delta B_{R2-R1}}$$

wherein $K_{wss}^{R2-R1}$ is the slope in the multispectral curve of the wheat canopy in each growth stage, $R2_{wss}$ and $R1_{wss}$ are reflectance values of two bands in the red-edge area of the multispectral curve of the wheat canopy extracted from the Sentinel-2 satellite image in each growth stage, and $\Delta B_{R2-R1}$ is an interval between wavelength positions of the two bands;

b, calculating a slope of a red-edge area of the multispectral curve of the field background:

$$K_{ss}^{R2-R1} = \frac{R2_{ss} - R1_{ss}}{\Delta B_{R2-R1}}$$

wherein $K_{ss}^{R2-R1}$ is the slope in the multispectral curve of the field background, and $R2_{ss}$ and $R1_{ss}$ are reflectance values of two bands in the red-edge area of the multispectral curve of the field background extracted from the Sentinel-2 satellite image in each growth stage; and c, calculating $SATF_{R2-R1}$ through the tangent function corrected by a background adjustment coefficient $\alpha$:

$$SATF_{R2-R1} = \frac{K_{wss}^{R2-R1} - \alpha \cdot K_{ss}^{R2-R1}}{1 + K_{wss}^{R2-R1} \cdot \alpha \cdot K_{ss}^{R2-R1}}$$

wherein $\alpha$ is the background adjustment coefficient;

step (3), constructing a lookup table of the background adjustment coefficient $\alpha$ based on simulated data of a PROSAIL model;

step (4), based on the lookup table of the background adjustment coefficient $\alpha$, determining the background adjustment coefficient $\alpha$ according to a target growth stage to be monitored or an estimated approximate LAI scope, and then based on measured data, determining $\alpha$ according to different growth stages, and calculating corresponding $SATF_{R2-R1}$;

step (5), determination of optimum $SATF_{R2-R1}$: based on a calculation formula of the "straw-soil" adjusted tangent function determined in step (2), calculating a plurality of $SATF_{R2-R1}$ based on multispectral band information of the red-edge area of the Sentinel-2 satellite image, and determining the optimum band selection and corresponding $SATF_{R2-R1}$ according to a comparison result between $SATF_{R2-R1}$ of different growth stages and LAI relevance;

step (6), construction of a wheat leaf area index (LAI) estimation model: based on the modeling data, establishing a relationship between different $SATF_{R2-R1}$ in different growth stages and the LAI by means of empirical linear fitting, determining coefficients a and b of a linear relationship, and establishing the wheat LAI estimation model; and step (7), inspection of the wheat LAI estimation model: validating and testing the wheat LAI estimation model by means of ten-fold cross-validation and independent measured data respectively: according to the wheat leaf area index (LAI) estimation model, validating an LAI predicted value estimated according to the multispectral curve of the wheat canopy and the multispectral curve of the field background; and inspecting the LAI predicted value through an LAI measured value in inspection data, and calculating a relative root mean square difference (RRMSE):

$$RRMSE_{val}(\%) = \frac{100}{\overline{LAI_m}} \sqrt{\frac{1}{N}\sum_{n=1}^{N}(LAI_{e,n} - LAI_{m,n})^2}$$

wherein N represents a sample number in a data set, and $LAI_{e,n}$, $LAI_{m,n}$, and $\overline{LAI_m}$ respectively represent the LAI predicted value, the LAI measured value, and a mean value of the LAI measured value.

2. The method for improving estimation of leaf area index in an early growth stage of wheat based on red-edge bands of Sentinel-2 satellite images according to claim 1, wherein in step (1), data is acquired from different ecosites in different years.

3. The method for improving estimation of leaf area index in an early growth stage of wheat based on red-edge bands of Sentinel-2 satellite images according to claim 1, wherein in step (1), the method for acquiring the multispectral curve of the wheat canopy and the multispectral curve of the field background comprises the following steps: acquiring a Sentinel-2 satellite image before emergence of wheat, and Sentinel-2 satellite images corresponding to various growth stages after the emergence of wheat, wherein the Sentinel-2 satellite images are subjected to image preprocessing by Sen2Cor and Sen2Res, and radiometric calibration and atmospheric correction on the Sentinel-2 satellite images are performed by adopting the Sen2Cor; performing downscaling processing on a coarse resolution band of the Sentinel-2 satellite images by adopting the Sen2Res, and improving the spatial resolution of each band of the Sentinel-2 satellite images to 10 m; and extracting the multispectral curves in the preprocessed Sentinel-2 satellite images according to GPS information of a wheat sampling point acquired by field investigation as the multispectral curve of the wheat canopy and the multispectral curve of the field background; and the red-edge area (665 nm-783 nm) of the multispectral curve of the wheat canopy and the multispectral curve of the field background comprises five pieces of band information: R, RE1, RE2, RE3, and NIR.

4. The method for improving estimation of leaf area index in an early growth stage of wheat based on red-edge bands of Sentinel-2 satellite images according to claim 1, wherein in step (3), the method for constructing a lookup table of the background adjustment coefficient α based on the simulated data of the PROSAIL model comprises the following steps: between 0 and 1, empirically valuing the background adjustment coefficient α with a step length of 0.1; calculating $SATF_{R2-R1}$ corresponding to all α values based on the simulated data in different backgrounds obtained by the PROSAIL model; summarizing the approximate LAI scope applicable to each α value according to scatter diagram distribution of "$SATF_{R2-R1}$-LAI" and the principle of same "$SATF_{R2-R1}$-LAI" in different backgrounds; and obtaining the growth stage applicable to each α value according to the LAI scope to form the lookup table for determining the background adjustment coefficient α by the growth stage or the approximate LAI scope.

5. The method for improving estimation of leaf area index in an early growth stage of wheat based on red-edge bands of Sentinel-2 satellite images according to claim 1, wherein in step (4), according to the lookup table of the background adjustment coefficient α, for $SATF_{R2-R1}$, the background adjustment coefficient α is set to be 1 in a tillering stage, and the background adjustment coefficient α is set to be 0.2 in a jointing & booting stage; and for $SATF_{R2-R1}$ in other band combinations, the background adjustment coefficient α is set to be 1 in the tillering stage, and the background adjustment coefficient α is set to be 0.5 in the jointing & booting stage.

6. The method for improving estimation of leaf area index in an early growth stage of wheat based on red-edge bands of Sentinel-2 satellite images according to claim 1, wherein in step (5), the method for determining the optimum band selection is performed in two steps:

a, based on the five pieces of band information: R, RE1, RE2, RE3, and NIR in the red-edge area of the multispectral curve of the wheat canopy extracted from the Sentinel-2 satellite image, determining calculation formulas of different slopes by way of permutation and combination, totally 10 slopes; and b, based on the calculation formulas of the 10 different slopes, respectively calculating the slope of the red-edge area of the multispectral curve of the wheat canopy and the slope of the red-edge area of the multispectral curve of the field background; acquiring 10 different $SATF_{R2-R1}$ through step (2); and performing linear fitting on the obtained $SATF_{R2-R1}$ with the LAI measured value of the corresponding growth stage, wherein $SATF_{R2-R1}$ with the maximum degree of linear fitting $R^2$ serves as the optimum option for estimating the LAI of wheat in the growth stage, and corresponding two bands are the optimum band combination: NIR-RE2.

7. The method for improving estimation of leaf area index in an early growth stage of wheat based on red-edge bands of Sentinel-2 satellite images according to claim 1, wherein in step (6), the optimum wheat leaf area index (LAI) estimation models in different growth stages are as follows:

tillering stage: LAI=1664.8×($SATF_{NIR-RE2}$)+1.8462; and jointing & booting stage: LAI=1966.7×($SATF_{NIR-RE2}$)+2.746.

8. A method for improving estimation precision of a leaf area index in an early growth stage of wheat, comprising the following steps:

step (1), acquiring valid Sentinel-2 satellite image data in each growth stage before and after emergence of wheat; preprocessing a Sentinel-2 satellite image by adopting Sen2Cor and Sen2Res, and improving the spatial resolution of each band of the Sentinel-2 satellite image to 10 m; and extracting multispectral curves in the preprocessed Sentinel-2 satellite image according to GPS information of a wheat sampling point acquired by field investigation as the multispectral curve of the wheat canopy and the multispectral curve of the field background;

step (2), calculating $SATF_{NIR-RE2}$ by the following formula:

calculating a slope between two bands of the multispectral curve of the wheat canopy:

$$K_{wss}^{NIR-RE2} = \frac{NIR_{wss} - RE2_{wss}}{\Delta B_{NIR-RE2}}$$

calculating a slope between two bands of the multispectral curve of the field background:

$$K_{ss}^{NIR-RE2} = \frac{NIR_{ss} - RE2_{ss}}{\Delta B_{NIR-RE2}}$$

obtaining $SATF_{R2-R1}$ of different growth stages according to a background adjustment coefficient α determined in different growth stages:

tillering stage:

$$SATF_{NIR-RE2} = \frac{K_{wss}^{NIR-RE2} - 1 \cdot K_{ss}^{NIR-RE2}}{1 + K_{wss}^{NIR-RE2} \cdot 1 \cdot K_{ss}^{NIR-RE2}}$$

jointing & booting stage:

$$SATF_{NIR-RE2} = \frac{K_{wss}^{NIR-RE2} - 0.5 \cdot K_{ss}^{NIR-RE2}}{1 + K_{wss}^{NIR-RE2} \cdot 0.5 \cdot K_{ss}^{NIR-RE2}}$$

step (3), estimating the LAI of wheat by utilizing the wheat LAI estimation models in the different growth stages based on the $SATF_{R2-R1}$ of different growth stages obtained in step (2):

tillering stage: LAI=1664.8×($SATF_{NIR-RE2}$)+1.8462; and jointing & booting stage: LAI=1966.7×($SATF_{NIR-RE2}$)+2.746.

\* \* \* \* \*